United States Patent
Hall et al.

(10) Patent No.: US 8,117,811 B1
(45) Date of Patent: *Feb. 21, 2012

(54) CUTTER SYSTEM FOR A HEADER OF A FORAGE HARVESTER

(75) Inventors: Larry D. Hall, Vero Beach, FL (US); Douglas S. Fitzkee, Ephrata, PA (US); Christopher A. Foster, Denver, PA (US); John H. Posselius, Ephrata, PA (US)

(73) Assignee: CNH America LLC, New Holland, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/896,072

(22) Filed: Oct. 1, 2010

(51) Int. Cl.
*A01D 43/00* (2006.01)

(52) U.S. Cl. ........................................................ 56/157

(58) Field of Classification Search ................... 56/157, 56/192, 13.7, 13.6
See application file for complete search history.

(56) References Cited

U.S. PATENT DOCUMENTS

| | | | |
|---|---|---|---|
| 299,142 A | 5/1884 | Hilton | |
| 490,384 A | 1/1893 | Crapsey | |
| 876,637 A | 1/1908 | Hare et al. | |
| 2,625,784 A * | 1/1953 | Kelsey | 56/192 |
| 2,748,552 A * | 6/1956 | Pool et al. | 56/10.2 R |
| 2,976,665 A | 3/1961 | Speckman | |
| 3,049,852 A * | 8/1962 | Jacobson | 56/15.3 |
| 3,389,539 A * | 6/1968 | Zweegers | 56/6 |
| 3,608,287 A * | 9/1971 | Gaertner | 56/13.7 |
| 3,772,953 A | 11/1973 | Sullivan | |
| 3,850,069 A | 11/1974 | Saunders | |
| 3,899,955 A | 8/1975 | Selch | |
| 4,199,922 A * | 4/1980 | van der Lely | 56/13.6 |
| 4,292,790 A * | 10/1981 | Mathews | 56/13.6 |
| 4,314,436 A * | 2/1982 | van der Lely | 56/13.6 |
| 4,448,014 A * | 5/1984 | Klinner | 56/13.6 |
| 4,487,003 A * | 12/1984 | Mathews et al. | 56/13.6 |
| 4,502,267 A * | 3/1985 | Klinner | 56/13.6 |
| 4,570,517 A | 2/1986 | Souza et al. | |
| 4,594,842 A * | 6/1986 | Wolters et al. | 56/94 |
| 5,027,684 A | 7/1991 | Neukam | |
| 5,040,362 A * | 8/1991 | Morgan et al. | 56/93 |
| 5,144,874 A | 9/1992 | Garrett | |
| 5,722,225 A * | 3/1998 | Wuebbels et al. | 56/60 |
| 6,032,444 A * | 3/2000 | Herron et al. | 56/60 |
| 6,272,820 B1 | 8/2001 | Otten et al. | |
| 7,290,341 B2 | 11/2007 | Kooima | |

* cited by examiner

*Primary Examiner* — Arpad Fabian-Kovacs
(74) *Attorney, Agent, or Firm* — Michael G. Harms; Sue Watson (57) ABSTRACT

A cutting system for a forage harvester includes a source of rotational movement for each of the pair of substantially planar counterrotating blades and for a pair of substantially planar counterrotating gripping members. Each blade of the pair of blades is configured to rotate about a substantially parallel axis. Each gripping member of the pair of gripping members is configured to rotate about a corresponding rotational axis of one blade of the pair of blades. The source of rotational movement is separated from each blade of the pair of blades by an inner shaft. The source of rotational movement is separated from each gripping member of the pair of gripping members by a tube surrounding the shaft. The tube includes a gripping portion secured to a periphery of the tube between the source of rotational movement and the pair of gripping members.

8 Claims, 6 Drawing Sheets

CUTTER SYSTEM FOR A HEADER OF A FORAGE HARVESTER

FIELD OF THE INVENTION

The present invention relates generally to crop forage harvesters. It relates more particularly to a cutter system for a crop forage harvester.

BACKGROUND OF THE INVENTION

The headers of plant-cutting machines (e.g., forage harvesters) are typically customized for specific applications (crops), which have specific growing seasons. Once the crops are harvested, the plant-cutting machines may sit dormant until the next growing season. Additional applications for which the plant-cutting machines could be used outside of indigenous crop growing seasons would be highly desirable.

What is needed is a cutter system for use with a forage harvester that may be used in applications having no specific growing season, permitting more effective use of the forage harvester.

SUMMARY OF THE INVENTION

The present invention relates to a cutting system for a forage harvester includes a source of rotational movement for each of the pair of substantially planar counterrotating blades and for a pair of substantially planar counterrotating gripping members. Each blade of the pair of blades is configured to rotate about a substantially parallel axis. Each gripping member of the pair of gripping members is configured to rotate about a corresponding rotational axis of one blade of the pair of blades. The source of rotational movement is separated from each blade of the pair of blades by an inner shaft. The source of rotational movement is separated from each gripping member of the pair of gripping members by a tube surrounding the shaft. The tube includes a gripping portion secured to a periphery of the tube between the source of rotational movement and the pair of gripping members.

The present invention further relates to a cutting system for a forage harvester including a source of rotational movement for each of the pair of substantially planar counterrotating blades and for a pair of substantially planar counterrotating gripping members. Each blade of the pair of blades is configured to rotate about a substantially parallel axis. Each gripping member of the pair of gripping members is configured to rotate about a corresponding rotational axis of one blade of the pair of blades. The source of rotational movement is separated from each blade of the pair of blades by an inner shaft. The source of rotational movement is separated from each gripping member of the pair of gripping members by a tube surrounding the shaft. The tube includes a gripping portion secured to a periphery of the tube between the source of rotational movement and the pair of gripping members. The gripping portion is selectably removable from the tube.

The present invention yet further relates to a kit for use in a forage harvester including a source of rotational movement for each of the pair of substantially planar counterrotating blades and for a pair of substantially planar counterrotating gripping members. Each blade of the pair of blades is configured to rotate about a substantially parallel axis. Each gripping member of the pair of gripping members is configured to rotate about a corresponding rotational axis of one blade of the pair of blades. The source of rotational movement is separated from each blade of the pair of blades by an inner shaft. The source of rotational movement is separated from each gripping member of the pair of gripping members by a tube surrounding the shaft. The kit includes a gripping portion secured to a periphery of the tube between the source of rotational movement and the pair of gripping members. The gripping portion is selectably removable from the tube.

An advantage of the present invention is a gripping portion that guides harvested crops toward the forage harvester.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
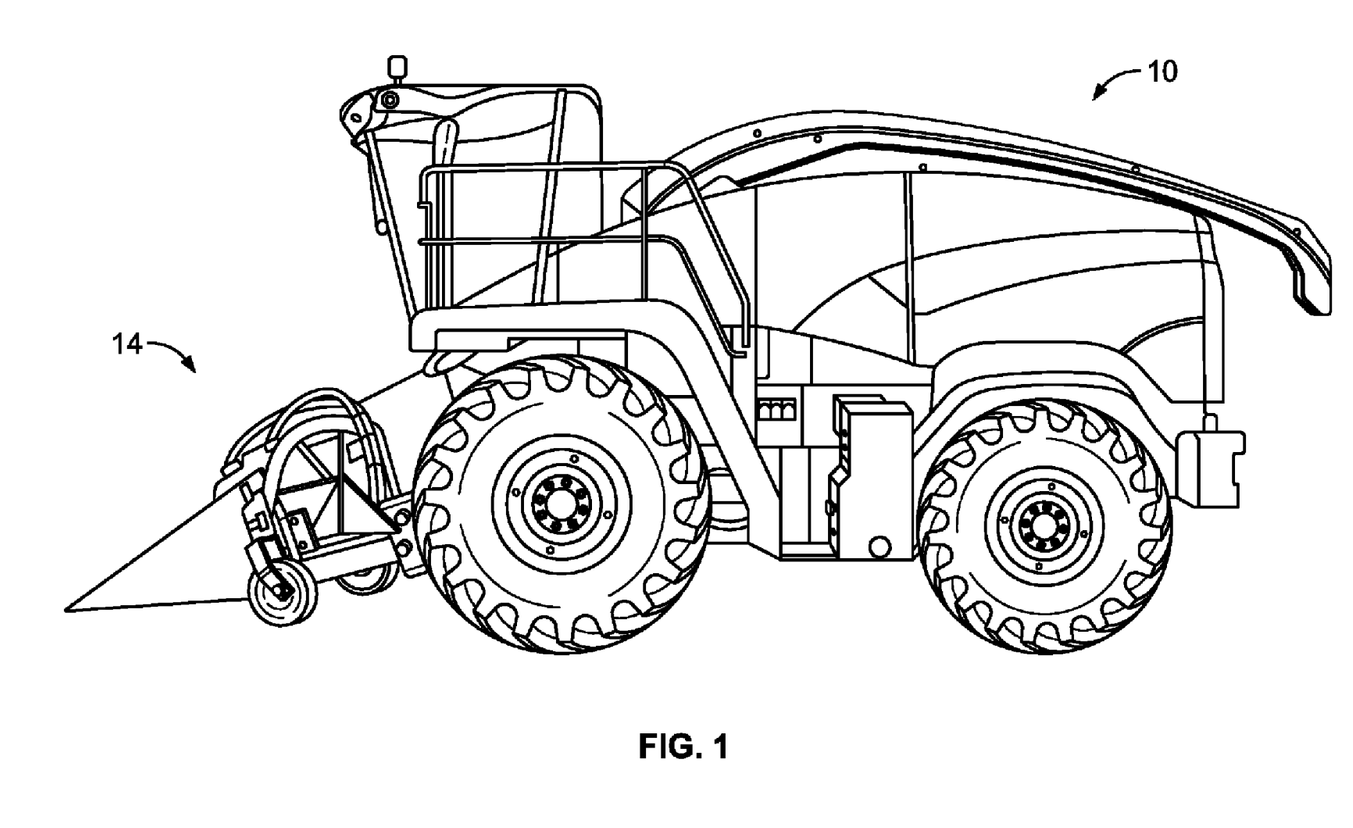
FIG. 1 is a side view of an embodiment of a forage harvester and harvesting header of the present invention.

A forage harvester 10, which is a well-known agricultural cutting and harvesting machine, is shown in FIG. 1. Forage harvester 10 includes a header 14, which can be configured to cut or sever crops, including (without limitation) forage crops (e.g., corn, alfalfa is), and to induct the cut or severed crops into the forage harvester for further processing. Both functions can be performed as forage harvester 10 moves forward over a crop field.

Figure 2:
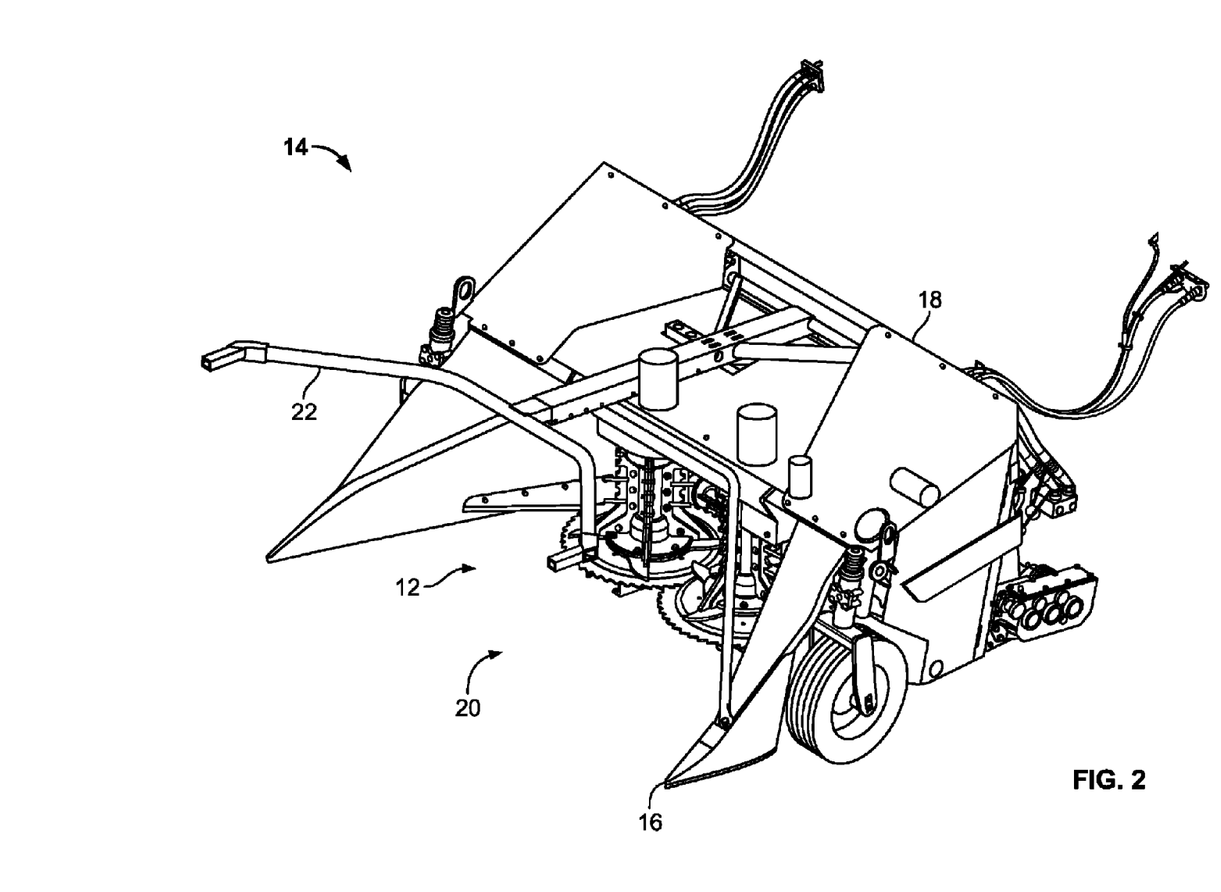
FIG. 2 is a top perspective view of the harvesting header of FIG. 1 of the present invention.
Figure 3:
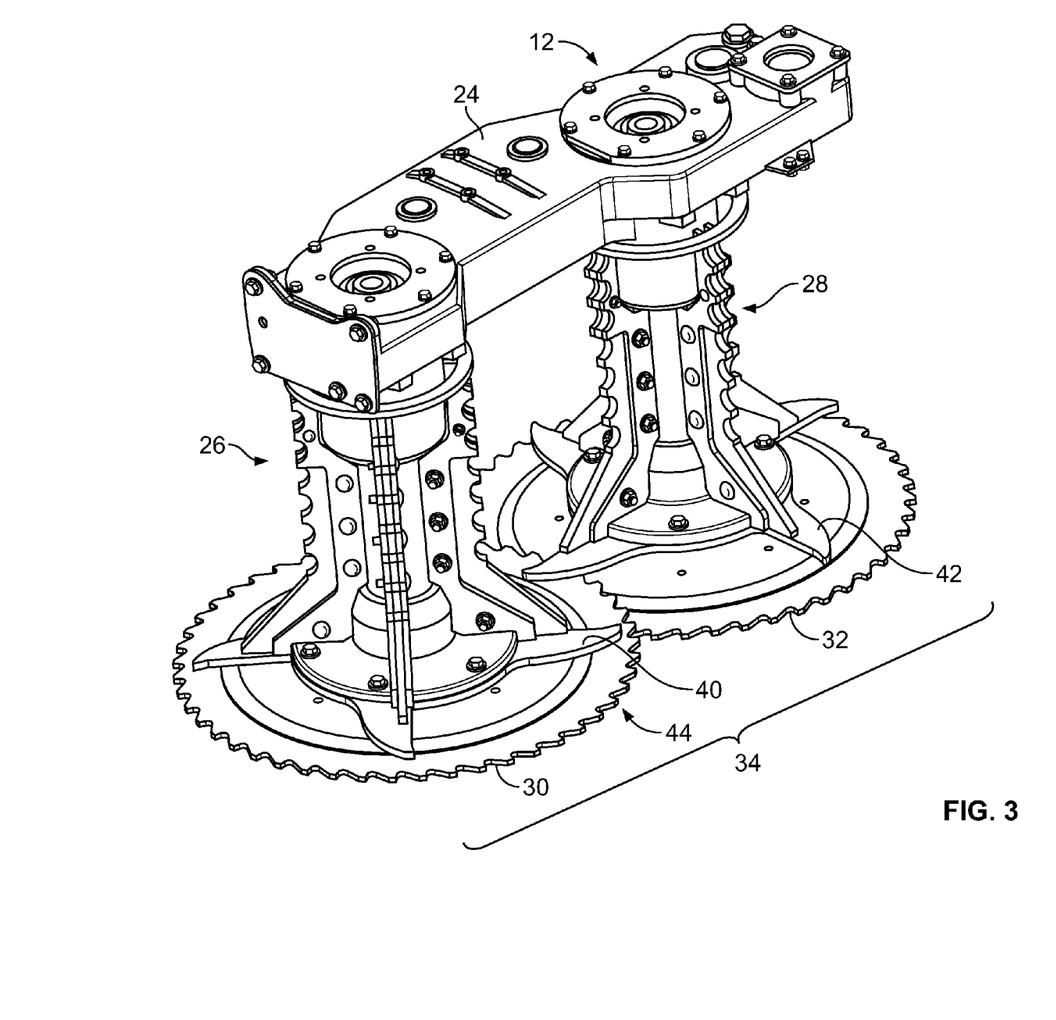
FIG. 3 is a top perspective view of a cutter system of the harvesting header of FIG. 2 of the present invention.

As shown in FIG. 2, header 14 includes a front end 16 that faces away from the forage harvester (not shown) and a back end 18 that attaches to the forage harvester. Front end 16 of header 14 further includes an opening 20 for receiving crops directed into the forage harvester. As further shown in FIG. 2, opening 20 leads to a cutting system 12, alternately referred to as a cutter system, that is configured to harvest crops having no specific growing season, in order to more efficiently utilize the forage harvester. For example, "woody" crops such as willow or poplar are being increasingly grown on tree farms and subsequently harvested for purposes of generating biofuels. In the case of willow, harvesting typically occurs every three to four years, with multiple stems having a base diameter of approximately two to three inches emanating from each coppiced plant. Although poplar trees can grow one to two stems, a typical three-year-old poplar tree has a base diameter of between about six to seven and one half inches. As a result of the larger base diameter, a push-bar 22, which extends along front end 16 of header 14 and exerts a horizontal bending force to the crop to be harvested, must be of similarly robust construction. The cutting system must also be extremely sturdy. It is to be understood that other crops, including other types of trees, may also be harvested by the cutting system.

As shown in FIGS. 3-7, cutting system 12 includes a rotational movement source 24, such as a gearbox, whether mechanically, electrically and/or hydraulically operated. Cutting system 12 further includes a rotor assembly 26 and a rotor assembly 28, each extending from rotational movement source 24 along respective parallel axes 36, 38. Opposite rotational movement source 24, rotor assembly 26 includes a blade 30, and rotor assembly 28 includes a blade 32, each alternately referred to as a saw blade. In operation, blade 30 and blade 32 are configured to counterrotate with respect to each other at about 3000 rpm. However, in another embodiment, the rotational speeds of blades 30, 32 may be different than 3000 rpm. Blades 30, 32 are substantially planar, although such planar construction is considered to also include hardened material secured to the blade tips such as carbide material, or more specifically, tungsten carbide and titanium carbide, or a layer of a similarly hardened material coating that is supplied to the surface of the blades in order to enhance their cutting operation or lengthen their operating life. That is, such hardened material, whether secured to a blade tip or other portion of the blade and providing a thickness that is different from the general thickness of the blade, is considered to be planar or substantially planar. In one embodiment, blades 30, 32 may each be approximately 30 inches in diameter, although in another embodiment, blades 30, 32 may be sized differently. While efficient operation is believed to occur when blades 30, 32 rotate at the same speed, in one embodiment, the blades may rotate at different speeds.

Blades 30, 32 rotate about respective parallel rotational axes 36, 38, the blades including an overlap 46 as measured in a direction parallel to the rotational axes. However, blades 30, 32 maintain a spacing 48 from each other as measured in a direction perpendicular to rotational axes 36, 38. As further shown in FIG. 5, each of blades 30, 32 is supported on opposed surfaces by platens 50, 52 with radially positioned fasteners 54.

Figure 5:
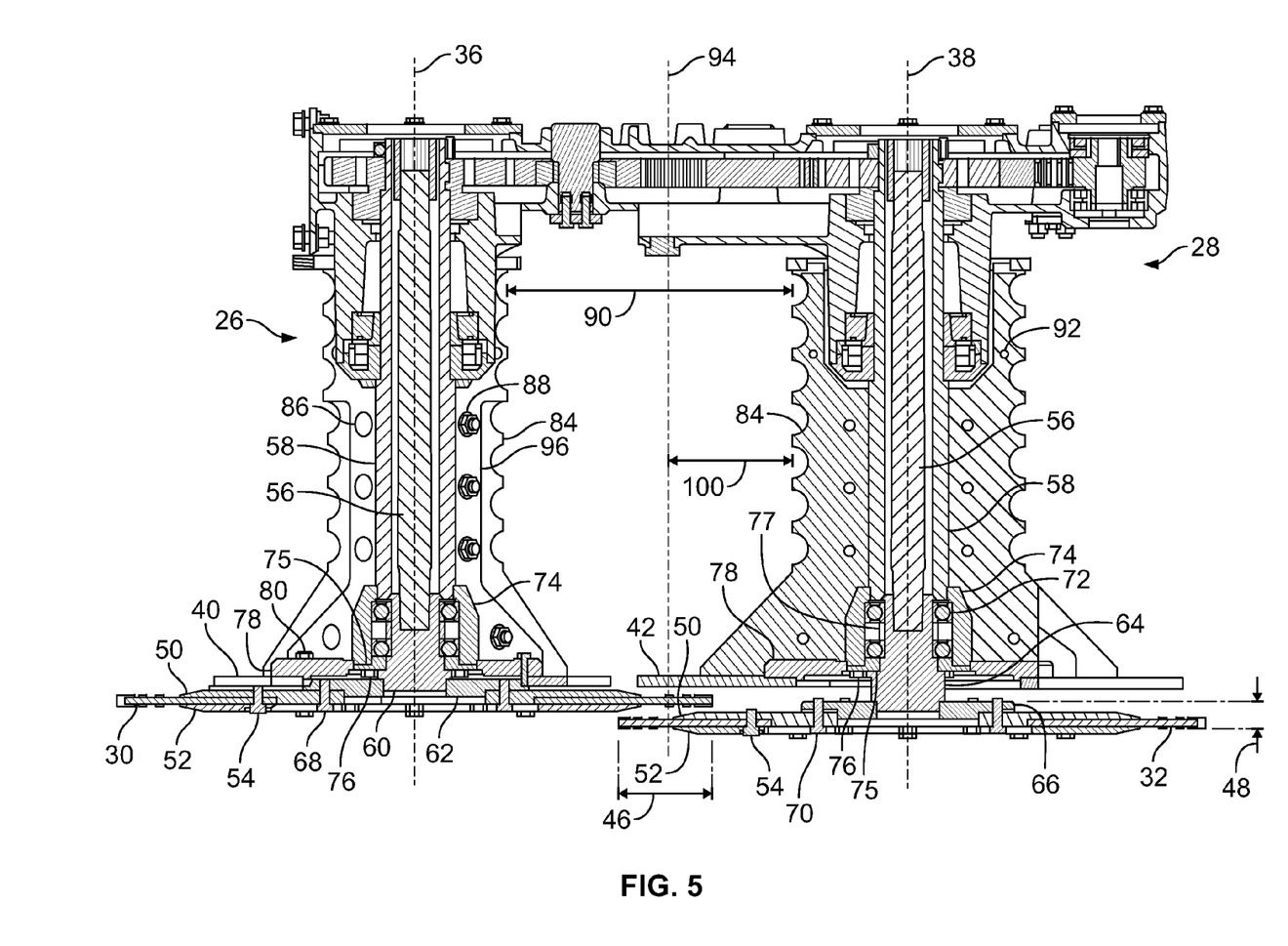
FIG. 5 is a cross section taken along line 5-5 from FIG. 4 of the present invention.
Figure 6:
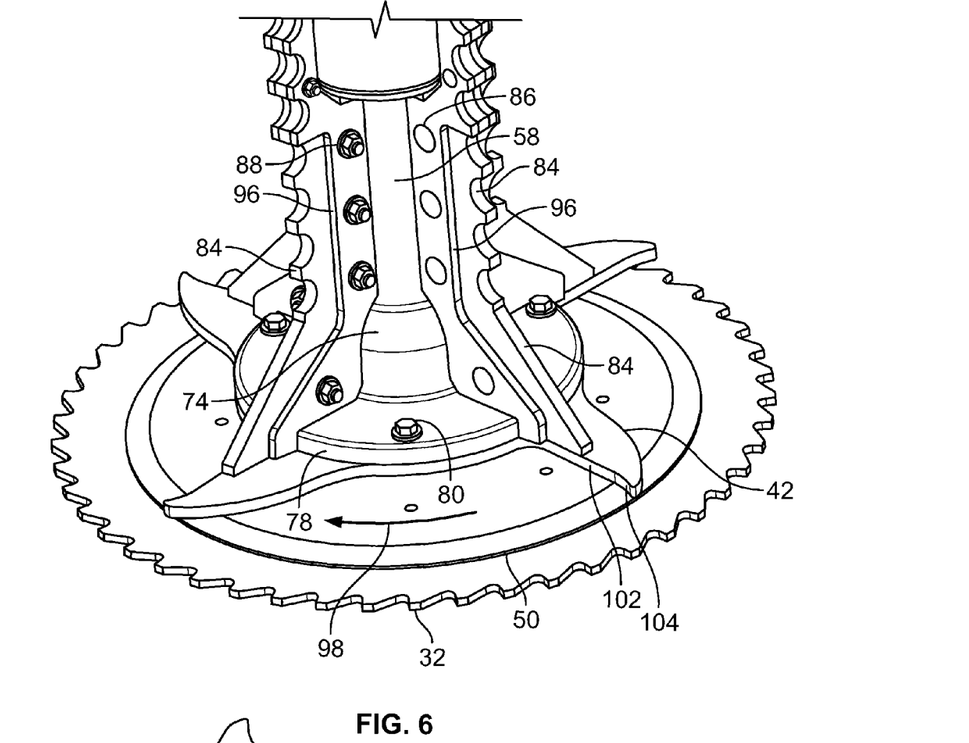
FIG. 6 is an enlarged top perspective view of a portion of a rotor assembly of the cutter system of the present invention.

As further shown in FIG. 5, source of rotational movement 24 is separated from each blade 30, 32 by a shaft 56 surrounded by a tube 58. Shaft 56 extends into a body of a hub 60 that is associated with blade 30. Shaft 56 extends into a body of a hub 64 that is associated with blade 32. The difference in the lengths of the bodies of respective hubs 60, 64 provides the spacing 48 between blades 30, 32.

Hub 60 includes a flange 62 that extends radially outward from axis 36, while hub 64 includes a flange 66 that extends radially outward from axis 38. Radially positioned fasteners 68 secure platen 50 to flange 62 of hub 60, permitting collective removal of blade 30 and surrounding platens 50, 52. Similarly, radially positioned fasteners 70 secure platen 50 to flange 66 of hub 64, permitting collective removal of blade 32 and surrounding platens 50, 52.

Tube 58, which surrounds shaft 56, extends from the source of rotational movement 24 to a collar 74 that is configured to receive a bearing pair 72. Ring 75 is positioned beneath collar 74 and includes a shoulder that contacts/supports bearing pair 72 and provides a fluid tight seal with the collar when the ring is installed to the collar with fasteners 76. Ring 75 secures the outer race of the lower bearing of bearing pair 72 in position, while hub 60, 64 secures the inner race of the lower bearing of bearing pair 72. A spacer 77 is positioned between the lower bearing and the upper bearing of bearing pair 72. A conventional retaining ring or snap ring contacts the upper bearing and applies a pre-load, collectively securing the lower bearing of bearing pair 72, spacer 77, and the upper bearing of bearing pair 72 in position. Bearing pair 72 rotationally isolates each of hubs 60, 64 from collar 74, which collar 74 is connected to tube 58. In other words, shaft 56 (and blade pair 34) rotate at a different rotational speed than tube 58 (and components attached to tube 58, including gripping members 40, 42 and gripping portions 84). In the exemplary embodiment, each tube 58 rotates about respective axes 36, 38 at approximately 168 rpm. In another embodiment, tube 58 may be configured to rotate at a different rotational speed. However, irrespective the rotational speed of each of tubes 58, the rotational speeds are synchronized, due to respective substantially planar gripping members 40, 42, collectively, a gripping member pair 44 or pair of gripping members, that rotate in the unison with tubes 58, which gripping members 40, 42 being aligned with each other in a direction perpendicular to their respective rotational axes 36, 38. In other words, gripping members 40, 42 are coplanar. As shown in an exemplary embodiment, gripping members 40, 42 define a four sided "star" configuration in which rotation of the gripping members are maintained in synchronization such that the "points" of one gripping member is maintained at a 45 offset with respect to the points of the other gripping member, in order to avoid a collision between the gripping members, since the gripping members are coplanar. In an alternate embodiment, the offset may be different.

Figure 7:
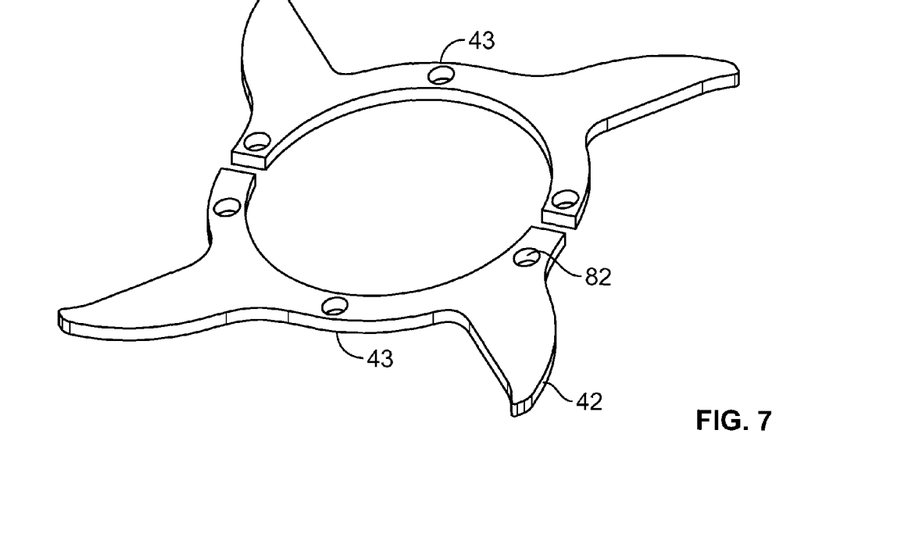
FIG. 7 is an exploded view of an embodiment of a gripping member of the present invention.

As further shown in FIG. 5, an end of collar 74 facing away from tube 58 abuts an annular plate 78. A surface of plate 78 facing away from collar 74 abuts a portion of a surface of gripping member 40 (associated with blade 30). Similarly, a surface of plate 78 facing away from collar 74 abuts a portion of a surface of gripping member 42 (associated with blade 32). Radially positioned fasteners 80 extend through aligned openings formed in plate 78 and threaded openings 82 formed in respective gripping members 40, 42 (FIG. 7; only gripping member 42 is shown in FIG. 7). By virtue of gripping members 40, 42 being formed into gripping member portions 43 (FIG. 7), upon removal of a sufficient number of corresponding fasteners 80, one or more of the gripping member portions 43 can be removed without having to first remove the corresponding blade 30 or 32. It is to be understood that while gripping member portions 43 are shown as subdividing the respective gripping member 40, 42 into two separate pieces, in another embodiment, the gripping member portions may subdivide the respective gripping member into more than two separate pieces.

Figure 4:
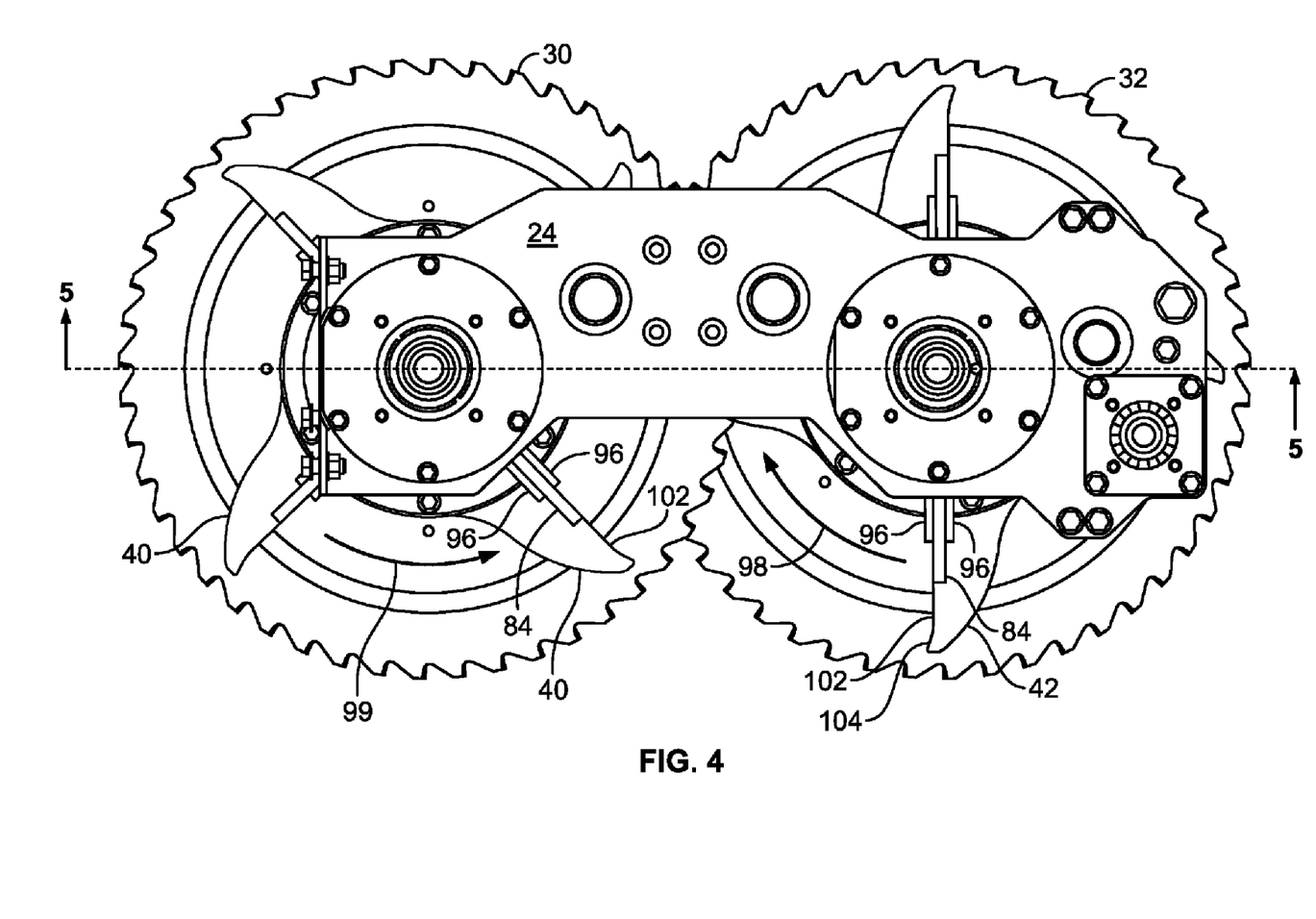
FIG. 4 is a plan view of the cutter system of FIG. 3 of the present invention.

As shown in FIGS. 3-6, tube 58 includes a plurality of gripping portion retainers 96 secured to the periphery of the tube, such as by welding, and extending between rotational movement source 24 and respective gripping members 40, 42. More specifically, as shown in the figures, gripping portion retainer 96 conformally extends along the perimeter of collar 74 and plate 78. As further shown in the figures, a pair of gripping portion retainers 96 are secured to tube 58, and configured to secure at least a portion of opposed surfaces of at least one gripping portion 84. Also as shown in the figures, the pairs of gripping portion retainers 96 each correspond to a "star point" of a gripping member 40, 42, although as shown in FIG. 4, one of the gripping portion retainers 96 is positioned forward of the gripping surface. However, in another embodiment, gripping portion retainers are not limited to be arranged in pairs nor limited to correspond to a gripping member. As further shown in FIG. 6, gripping portion 84 is aligned with at least a portion of a gripping surface of gripping members 40, 42. In other words, gripping portion 84 provides structural support for the gripping members, permitting the gripping members to further extend radially from their respective rotational axes for enhanced operation.

In operation, blade 32 and gripping member 42 rotate about axis 38 in a rotational direction 98, and blade 30 and gripping member 40 rotate about axis 36 in a rotational direction 99 that is opposite of rotational direction 98. The crop (not shown) is bent forward in a direction away from header 14 by push-bar 22 (FIG. 2) prior to counter rotating blades 30, 32 cutting through the base of the crop. Once the base of the crop is severed (separated from the ground) by blades 30, 32, also referred to as blade pair 34 or pair of blades 34, gripping surface 102 of gripping members 40, 42 begin gripping/guiding the base of the freshly cut crop inside of the forage harvester for further processing. As further shown in the figures, gripping surface 102 may further include a forward-extending point 104 to further enhance the gripping ability of the gripping members. In addition to gripping surface 102 of the gripping members, gripping portions 84, which are secured to gripping portion retainers 96 by virtue of fasteners 86, 88, define a throat 90 (FIG. 5) or spacing between the serrated blades of gripping portion 84 of rotor of assemblies 26, 28. For example, axis 94 defines a center line equidistant between axes 36, 38. A partial throat opening 100 (FIG. 5) represents a spacing between the center axis 94 and the serrated blades of gripping portion 84. In other words, gripping portions 84 that include openings 92 that align with corresponding openings in gripping portion retainer 96 configured to receive fasteners may be used. It is to be understood that gripping portions 84 may be sized differently, providing different throat spacing between parallel axes 36, 38, and that a partial throat opening 100 may not necessarily correspond to a center axis 94. In another embodiment, it may be desirable to utilize differently sized gripping portions 84 associated with one or more of the gripping portion retainers 96, depending upon the application. In yet another embodiment, gripping portion retainer 96 may span one side of each of adjacent gripping portions (not shown), if desired.

As further shown in the figures, the installation of fasteners 86 are representative of the head of the fastener, in which the head defines a substantially non-gripping surface, such as that corresponding to a carriage bolt, the head defining a smooth surface, versus a hexagonal or other shape having pronounced edges. Other types of fastener heads such as flush fasteners, including fastener heads with a recessed retention feature such as those configured to receive a blade screwdriver a Phillips screwdriver or other recessed geometry may also be used. Such non-gripping surfaces may reduce the "aggressiveness" or feed rate associated with gripping hand feeding the newly harvested crop into the forage harvester, and reduces the tendency of damage to the fastener head by the harvested crop. To achieve such benefits for the non-gripping surface, fasteners 86 should face the direction of rotational movement about the corresponding rotational axis. That is, for fasteners associated with blade 30 and rotating about axis 36 in a rotational direction 99, the non-gripping surface of the fasteners should be mounted on the surface of gripping portion retainer 96 facing the rotational direction 99. Similarly, for fasteners associated with blade 32 and rotating about axis 38 in a rotational direction 98, the non-gripping surface of the faster should be mounted on the surface of gripping portion retainer 96 facing the rotational direction 98.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A cutting system for a forage harvester comprising:
a header including a source of rotational movement connected to spaced-apart first and second rotor assemblies extending therefrom, the header comprising:
at least first and second substantially planar and circular counterrotating blades, first blade and second blade each configured to rotate about a substantially parallel axis, a portion of the first and second blades at least partially overlapping each other continuously, the first and second blades spaced from each other such that the first blade is positioned to rotate on a first rotational axis and the second blade is positioned to rotate on a second rotational axis, such that the direction of rotation of the first and second blades is perpendicular to the first and second rotational axes;
a first pair of semi-circular plates, each of the pair of first semi-circular plates having at least one substantially planar gripping member extending outwardly beyond an edge thereof, the first pair of semi-circular plates together cooperating to form a counterrotating first circular plate which is positioned above the first blade, and a second pair of semi-circular plates, each of the pair of second semi-circular plates having at least one gripping member extending outwardly beyond an edge thereof, the second pair of semi-circular plates together cooperating to form a counterrotating second circular plate which is positioned above the second blade, wherein the gripping members of the first and second circular plates are aligned with each other in a direction perpendicular to the first and second vertical rotational axes;
first and second shafts, each first and second shaft positioned about first and second rotational axes, respectively, and operatively connected to first and second rotary assemblies and to first and second blades, respectively, the first and second shafts causing the first and second blades to counterrotate at a first speed;
first and second tubes positioned over first and second shafts, respectively, each first and second tube operatively coupled to the source of rotational movement at an upper end and to first and second circular plates, respectively, at an opposite lower end, the first and second tubes causing the first and second circular plates and the griping members thereon to counterrotate above the first and second blades, the first and second plates and their respective gripping members extending therefrom and configured to rotate at a second speed, which is different than the first speed of the first and second blades;
wherein at least a portion of each gripping member extends parallel to and beyond an outer edge of each of the first and second plates, and
a first plurality of gripping portions positioned vertically over an outer perimeter of the first tube and a second plurality of gripping portions positioned vertically over an outer perimeter of the second tube,
wherein the combination of spaced-apart first and second vertical tubes, each with a plurality of gripping portions positioned vertically thereon, and the first and second circular blades cooperate to form a throat opening configured to receive crop therethrough when the crop is cut by the first and second blades and pushed toward the throat opening by the plurality of gripping members, and wherein each of the plurality of gripping portions is selectively removable from each of the first and second tubes.

2. The cutting system of claim 1, wherein the first tube surrounds the first shaft, and the second tube surrounds the second shaft, and each first and second tube rotates independently from each first and second shaft.

3. The cutting system of claim 1, wherein the at least one gripping member comprises a plurality of gripping members, and wherein each of the first and second plurality of gripping portions is configured to abut and align with at least one of the plurality of gripping members.

4. The cutting system of claim 3, comprising a plurality of gripping portion retainers, a portion of the plurality of gripping portion retainers secured to each first tube and each second tube for securing at least a portion of a surface of each of the first and second plurality of gripping portions to each first and second tube, respectively.

5. A cutting system for a forage harvester comprising:
a header including a source of rotational movement connected to spaced-apart first and second rotor assemblies extending therefrom, the header comprising:
at least first and second substantially planar and circular counterrotating blades, first blade and second blade each configured to rotate about a substantially parallel axis, a portion of the first and second blades at least partially overlapping each other continuously, the first and second blades spaced from each other such that the first blade is positioned to rotate on a first rotational axis and the second blade is positioned to rotate on a second rotational axis, such that the direction of rotation of the first and second blades is perpendicular to the first and second rotational axes;
a first pair of semi-circular plates, each of the pair of first semi-circular plates having at least one substantially planar gripping member extending outwardly beyond an edge thereof, the first pair of semi-circular plates together cooperating to form a counterrotating first circular plate which is positioned above the first blade, and
a second pair of semi-circular plates, each of the pair of second semi-circular plates having at least one gripping member extending outwardly beyond an edge thereof, the second pair of semi-circular plates together cooperating to form a counterrotating second circular plate which is positioned above the second blade, wherein the gripping members of the first and second circular plates are aligned with each other in a direction perpendicular to the first and second vertical rotational axes;
first and second shafts, each first and second shaft positioned about first and second rotational axes, respectively, and operatively connected to first and second rotary assemblies and to first and second blades, respectively, the first and second shafts causing the first and second blades to counterrotate at a first speed;
first and second tubes positioned over first and second shafts, respectively, each first and second tube operatively coupled to the source of rotational movement at an upper end and to first and second circular plates, respectively, at an opposite lower end, the first and second tubes causing the first and second circular plates and the griping members thereon to counterrotate above the first and second blades, the first and second plates and their respective gripping members extending therefrom and configured to rotate at a second speed, which is different than the first speed of the first and second blades,
wherein at least a portion of each gripping member extends parallel to and beyond an outer edge of each of the first and second plates, and
a first plurality of gripping portions positioned vertically over an outer perimeter of the first tube and a second plurality of gripping portions positioned vertically over an outer perimeter of the second tube,
wherein the combination of spaced-apart first and second vertical tubes, each with a plurality of gripping portions positioned vertically thereon, and the first and second circular blades cooperate to form a throat opening configured to receive crop therethrough when the crop is cut by the first and second blades and pushed toward the throat opening by the plurality of gripping members, and
wherein each of the plurality of gripping portions is selectively removable from each of the first and second tubes.

6. The cutting system of claim 5, wherein each of the first and second plurality of gripping portions is selectively removable by a mechanical fastener.

7. The cutting system of claim 5, wherein the first tube surrounds the first shaft, and the second tube surrounds the second shaft, and each first and second tube rotates independently from each first and second shaft.

8. The cutting system of claim 5, wherein the at least one gripping member comprises a plurality of gripping members, and wherein each of the first and second plurality of gripping portions is configured to abut and align with at least one of each of the plurality of gripping members.

* * * * *